(12) United States Patent
Yamaguchi et al.

(10) Patent No.: US 8,126,672 B2
(45) Date of Patent: Feb. 28, 2012

(54) EAR-TYPE THERMOMETER AND A CONTROL METHOD THEREOF

(75) Inventors: Keiji Yamaguchi, Fujinomiya (JP); Hideo Harada, Kanagawa (JP)

(73) Assignee: Terumo Kabushiki Kaisha, Shibuya-Ku, Tokyo (JP)

( * ) Notice: Subject to any disclaimer, the term of this patent is extended or adjusted under 35 U.S.C. 154(b) by 198 days.

(21) Appl. No.: 12/567,354

(22) Filed: Sep. 25, 2009

(65) Prior Publication Data

US 2010/0017163 A1    Jan. 21, 2010

Related U.S. Application Data

(63) Continuation of application No. PCT/JP2008/054581, filed on Mar. 13, 2008.

(30) Foreign Application Priority Data

Mar. 26, 2007   (JP) .................................. 2007-080124

(51) Int. Cl.
*G01K 15/00* (2006.01)

(52) U.S. Cl. .......... 702/99; 374/121; 374/158; 374/209; 600/474; 600/186; 600/203

(58) Field of Classification Search ............. 702/99; 374/121, 132, 133, 158, 209, E1.013; 600/474, 600/186, 203
See application file for complete search history.

(56) References Cited

U.S. PATENT DOCUMENTS

| 5,018,872 | A | | 5/1991 | Suszynski et al. |
| 6,149,297 | A | * | 11/2000 | Beerwerth et al. ............. 374/121 |
| 6,195,581 | B1 | | 2/2001 | Beerwerth et al. |
| 6,367,973 | B2 | * | 4/2002 | Yamaka ........................ 374/158 |
| 6,386,757 | B1 | * | 5/2002 | Konno ........................... 374/158 |
| 6,522,912 | B1 | * | 2/2003 | Nakatani et al. ............... 600/474 |
| 7,209,775 | B2 | * | 4/2007 | Bae et al. ....................... 600/340 |
| 2001/0014112 | A1 | * | 8/2001 | Yamaka ........................ 374/158 |
| 2002/0037026 | A1 | * | 3/2002 | Sato et al. ...................... 374/132 |
| 2002/0131473 | A1 | * | 9/2002 | Konno ........................... 374/121 |

(Continued)

FOREIGN PATENT DOCUMENTS

JP          11-104086 A      4/1999

(Continued)

OTHER PUBLICATIONS

International Search Report (PCT/ISA/210) dated Mar. 26, 2008.

(Continued)

*Primary Examiner* — Carol Tsai
(74) *Attorney, Agent, or Firm* — Buchanan, Ingersoll & Rooney PC

(57) ABSTRACT

An ear-type thermometer which measures body temperature using a temperature detection element 21 that detects ambient temperature and an infrared detection element 22 that detects infrared radiation from a measurement site within the aural cavity, the 2 elements housed in a probe 3, wherein the ear-type thermometer comprises a probe cover 10 which can be detachably provided with the probe, a detection switch 60 which detects that the probe cover is attached or detached to the probe, and two temperature conversion coefficients 52a and 52b which corrects body temperature based on the detection result from the two detection elements. Further, the thermometer comprises a detection switch 60 which detects that the probe cover is attached or detached to and from the probe, a temperature conversion coefficient 52a which corrects body temperature based on detection results from the two detection elements, a control unit 50 which determines whether the probe cover has exceeded the usage count limit or not using an actual usage count, a speaker 12 or a liquid crystal display unit which alerts need to replace the probe cover when the usage count limit has been exceeded.

9 Claims, 12 Drawing Sheets

U.S. PATENT DOCUMENTS

2003/0074155 A1* 4/2003 Ota ............................. 702/134
2004/0022297 A1   2/2004 Tabata et al.
2004/0225207 A1* 11/2004 Bae et al. ..................... 600/340

FOREIGN PATENT DOCUMENTS

| JP | 11-123179 A | 5/1999 |
| JP | 2000-217788 A | 8/2000 |
| WO | WO 97/19331 A1 | 5/1997 |
| WO | WO 01/96825 A1 | 12/2001 |

OTHER PUBLICATIONS

Written Opinion (PCT/ISA/237) dated Mar. 26, 2008.
English translation of International Preliminary Report on Patentability issued Sep. 29, 2009 by the International Bureau of WIPO in Switzerland in International Application No. PCT/JP2008/054581.
Taiwanese Office Action issued Oct. 24, 2011 by the Taiwanese Patent Office in counterpart Taiwanese Patent Application.

* cited by examiner

EAR-TYPE THERMOMETER AND A CONTROL METHOD THEREOF

TECHNICAL FIELD

The present invention relates an ear-type thermometer and a control method thereof.

BACKGROUND ART

Ear-type thermometers that measure body temperature based on detection results from a thermistor, a temperature detection element that detects ambient temperature, and a thermopile comprised of cold junctions and hot junctions, an infrared light detection element that detects infrared light emitted from a temperature measurement site within the aural cavity, both housed in a probe of the thermometer, has become widespread.

The applicant of the present patent application has previously introduced an ear-type thermometer in which a thermistor and a thermopile are each placed at a distance from the opening of a probe, and infrared radiation is guided from the opening of the probe to the thermopile via a light-guiding tube.

Using such configuration, it is possible to reduce the external dimensions of an end portion which is formed to have an opening at the tip of the probe, allowing insertion into the aural cavity. Further, accurate measurement of body temperature with a conventional thermometer is made difficult due to conduction of body temperature when the probe is inserted into the aural cavity. However, by placing a light-guiding tube to intervene as described above, it is possible to make accurate measurement of body temperature even when body heat is conducted through the probe.

Further, according to the ear-type thermometer mentioned above, a separate probe cover which is configured to cover the probe opening as well as the entire probe is provided. This probe cover is formed as a single unit with a flange portion, and is configured to be freely attached and detached using a probe cover attachment tool which attaches to the probe. This arrangement allows the probe cover to be rinsed with water, making it easy to keep the probe clean even when the probe cover gets covered with ear wax or when a large number of unknown patients are examined using the thermometer, improving hygiene (patent reference 1).

[Patent Reference 1] Japanese Patent Laid-Open No. H11-123179

As described above, when removably placing a probe cover configured to cover the probe opening as well as the entire probe using a probe cover attachment tool, it is desirable for hygienic reasons to rinse the probe cover on a regular basis using water.

On the other hand, according to conventional ear-type thermometers, measurement of body temperature by thermopile is performed regardless of whether a probe cover is attached to the probe or not.

When a probe cover is attached to the probe, a significant amount of infrared light is blocked by the probe cover. For this reason, an error in body temperature measurement occurs when compared to a measurement made without using a probe cover on the probe.

However, probe covers used in such fashion eventually show problems in durability after repeated use, which also exerts negative effect on the measurement accuracy.

DESCRIPTION OF INVENTION

Problem to be Solved

Accordingly, the present invention is conceived in consideration of above-mentioned problem, and aims to provide an ear-type thermometer which does not cause any error in body temperature measurement regardless of whether or not a probe cover is placed on the probe, and a control method thereof.

Further, the present invention aims to provide an ear-type thermometer which alerts need for replacement of the probe cover such that they do not exceed their usage count limitation thereby eliminating negative effect on temperature measurement result and a control method thereof.

Means for Solving the Problem

In order to solve the problem discussed above, an ear-type thermometer according to the present invention having a probe formed with a probe opening at its tip which houses a temperature detection element which detects ambient temperature and an infrared detection element which detects infrared light emitted from a temperature measurement site within the aural cavity, and measures body temperature based on detection results from said two detection elements, comprises a probe cover which can be freely attached and detached onto and from said probe and covers said probe opening, a detection unit which detects attachment/detachment of said probe cover onto said probe, and a correction unit which corrects, based on the detection result of said detection unit, body temperature based on detection results of said two detection elements.

Further, the ear-type thermometer of the present invention comprises a probe cover attachment tool, and said probe has an end face formed to have said probe opening, an inner side surface of a hollow cylindrical body, a locking part which protrudes inwards from said inner side surface, said ear-type thermometer comprising a detection element housing body which includes a mounting base member onto which said two detection elements are fixed, a cylindrical container member fixed to said mounting base member, surrounds said two detection elements, and has a hole which orients said two detection elements towards said opening, a cylindrical window member attached on top of and blocks said hole, and passes infrared light through, wherein said window member of said detection element housing body contacts said end face on the side of said detection elements such that said probe opening is blocked while said mounting base member is fixed in place by said engagement part, and wherein said detection unit includes a mechanical contact switch which is placed on said inner side surface and makes contact against the inner perimeter surface of said probe cover, an electric contact switch which is placed on said inner side surface and makes contact against a conductive layer which is laid on the inner perimeter surface of said probe cover, or an optical switch is placed on said inner side surface and detects reflected light from a reflective layer which is laid on the inner perimeter surface of said probe cover.

Further, the ear-type thermometer of the present invention comprises a probe cover attachment tool which fixes said probe in an attached state by locking in the flange portion of said probe cover, a detection element housing mounted onto a mounting board, and including a mounting base member for fixing said two detection elements, a cylindrical container member having a hole facing said infrared detection element while being fixed to said mounting base member and surrounding said two detection elements, and a light guiding tube placed between said probe opening and said hole, wherein said detection unit is placed on top of said mounting board and includes an optical switch which detects a reflection layer laid on said flange portion from reflection of light.

Further, the ear-type thermometer of the present invention further comprises a main body cover which covers a liquid crystal display unit that performs display of body temperature measurement results, wherein said probe is formed as a single unit with said main body cover such that said probe is on the same side as said liquid crystal display unit.

Further, said correction unit performs temperature correction which calculates correlation coefficient between detected temperature signal based on the detection results of said two detection elements and actual body temperature signal based on actual body temperature, and at the same time performs temperature conversion using a first temperature conversion coefficient calculated by applying said temperature correction in a state without said probe cover and a second temperature conversion coefficient calculated by applying said temperature correction in a state with said probe cover.

Further, according to the present invention, a method of controlling the ear-type thermometer which measures body temperature based on detection results of a temperature detection element which detects ambient temperature, and an infrared detection element which detects infrared lights emitted from a temperature measurement site within the aural cavity, said two detection elements placed within a probe having a probe opening at its tip, comprises a step of detecting whether a probe cover, which can be freely attached and detached onto and from said probe and covers said probe opening, is attached or detached from a detection unit, and a step of correcting, based on the detection result of said detection unit, body temperature based on detection results from said two detection element.

Further, according to the present invention, in order to measure body temperature based on detection results of a temperature detection element which detects ambient temperature, and an infrared detection element which detects infrared lights emitted from a temperature measurement site within the aural cavity, said two detection elements placed within a probe having a probe opening at its tip, a computer program for an ear-type thermometer of the present invention comprises a program for a step of detecting whether a probe cover, which can be freely attached and detached onto and from said probe and covers said probe opening, is attached or detached from a detection unit, and a program for a step of correcting, based on the detection result of said detection unit, body temperature based on detection results from said two detection element.

Further, an ear-type thermometer according to the present invention having a probe formed with a probe opening at its tip which houses a temperature detection element which detects ambient temperature and an infrared detection element which detects infrared light emitted from a temperature measurement site within the aural cavity, and measures body temperature based on detection results from said two detection elements, comprises a probe cover which can be freely attached and detached onto and from said probe and covers said probe opening, a detection unit which detects attachment/detachment of said probe cover onto said probe, a correction unit which corrects, based on the detection result of said detection unit, body temperature based on detection results of said two detection elements, a determination unit which determines whether or not said probe cover has been used more than a usage count limitation based on the actual usage count and an alert unit or a display unit for alerting need to replace said probe cover when the determination result from said determination unit exceeds said usage count limitation.

Further, the ear-type thermometer of the present invention comprises a probe cover attachment tool, and said probe has an end face formed to have said probe opening, an inner side surface of a hollow cylindrical body, a locking part which protrudes inwards from said inner side surface, said ear-type thermometer comprising a detection element housing body which includes a mounting base member onto which said two detection elements are fixed, a cylindrical container member fixed to said mounting base member, surrounds said two detection elements, and has a hole which orients said two detection elements towards said opening, a cylindrical window member attached on top of and blocks said hole, and passes infrared light through, wherein said window member of said detection element housing body contacts said end face on the side of said detection elements such that said probe opening is blocked while said mounting base member is fixed in place by said engagement part, and wherein said detection unit includes a mechanical contact switch which is placed on said inner side surface and makes contact against the inner perimeter surface of said probe cover, an electric contact switch which is placed on said inner side surface and makes contact against a conductive layer which is laid on the inner perimeter surface of said probe cover, or an optical switch is placed on said inner side surface and detects reflected light from a reflective layer which is laid on the inner perimeter surface of said probe cover.

Further, the ear-type thermometer of the present invention comprises a probe cover attachment tool which fixes said probe in an attached state by locking in the flange portion of said probe cover, a detection element housing mounted onto a mounting board, and including a mounting base member for fixing said two detection elements, a cylindrical container member having a hole facing said infrared detection element while being fixed to said mounting base member and surrounding said two detection elements, and a light guiding tube placed between said probe opening and said hole, wherein said detection unit is placed on top of said mounting board and includes an optical switch which detects a reflection layer laid on said flange portion from reflection of light.

Further, the ear-type thermometer of the present invention further comprises a main body cover which covers a liquid crystal display unit that performs display of body temperature measurement results, wherein said probe is formed as a single unit with said main body cover such that said probe is on the same side as said liquid crystal display unit.

Further, said correction unit performs temperature correction which calculates correlation coefficient between detected temperature signal based on the detection results of said two detection elements and actual body temperature signal based on actual body temperature, and at the same time performs temperature conversion using a temperature conversion coefficient calculated by applying said temperature correction in a state with said probe cover.

Further, said determination unit comprises a storage unit which preferentially stores said usage count regardless of whether a power supply unit is loaded or not.

Further, a method of controlling the ear-type thermometer according to the present invention having a probe formed with a probe opening at its tip which houses a temperature detection element which detects ambient temperature and an infrared detection element which detects infrared light emitted from a temperature measurement site within the aural cavity, and measures body temperature based on detection results from said two detection elements, comprises a step of detecting attachment/detachment of said probe cover onto said probe with said detection unit, a step of correcting, based on the detection result of said detection unit, body temperature based on detection results of said two detection elements with said correction unit, a step of determining whether or not said probe cover has been used more than a usage count limitation based on the actual usage count with said determination unit, and a step of alerting need to replace said probe cover when the determination result from said determination unit exceeds said usage count limitation with said alerting unit.

Also, according to the present invention, in order to measure body temperature based on detection results of a temperature detection element which detects ambient temperature, and an infrared detection element which detects infrared lights emitted from a temperature measurement site within the aural cavity, said two detection elements placed within a probe having a probe opening at its tip, a computer program for an ear-type thermometer of the present invention comprises a program for a step of detecting whether a probe cover, which can be freely attached and detached onto and from said probe and covers said probe opening, is attached or detached from a detection unit, a program for a step of correcting, based on the detection result of said detection unit, body temperature based on detection results from said two detection element, a program for a step of determining whether or not said probe cover has been used more than a usage count limitation based on the actual usage count with said determination unit, and a program for a step of alerting need to replace said probe cover when the determination result from said determination unit exceeds said usage count limitation with said alerting unit.

Further features of the present invention will be explained in the best mode for carrying out the invention and accompanying figures.

Effects of Invention

According to the present invention, it is possible to provide an ear-type thermometer which detects attachment/detachment of the probe cover on the probe, and performs correction based on the detection result thereby eliminating error in body temperature measurement result and a control method thereof.

Further, according to the present invention, it is possible to provide an ear-type thermometer which detects attachment status of the probe cover to the probe, determines whether the probe cover has been used for more than the usage count limit from actual usage based on the detection result, and giving out an alert for replacement when the usage count limit has been surpassed, thereby eliminating negative effect on the body temperature measurement and a control method thereof.

Other features and advantages of the present invention will be explained in the detailed description provided below with reference to accompanying figures. Note that identical or similar structures are given the same reference numeral in the accompanying figures.

BRIEF DESCRIPTION OF DRAWINGS

Accompanying figures are included in and form a part of the specification, illustrate embodiments of the present invention, and are used to explain the principles of the present invention along with their descriptions.

Figure 1:
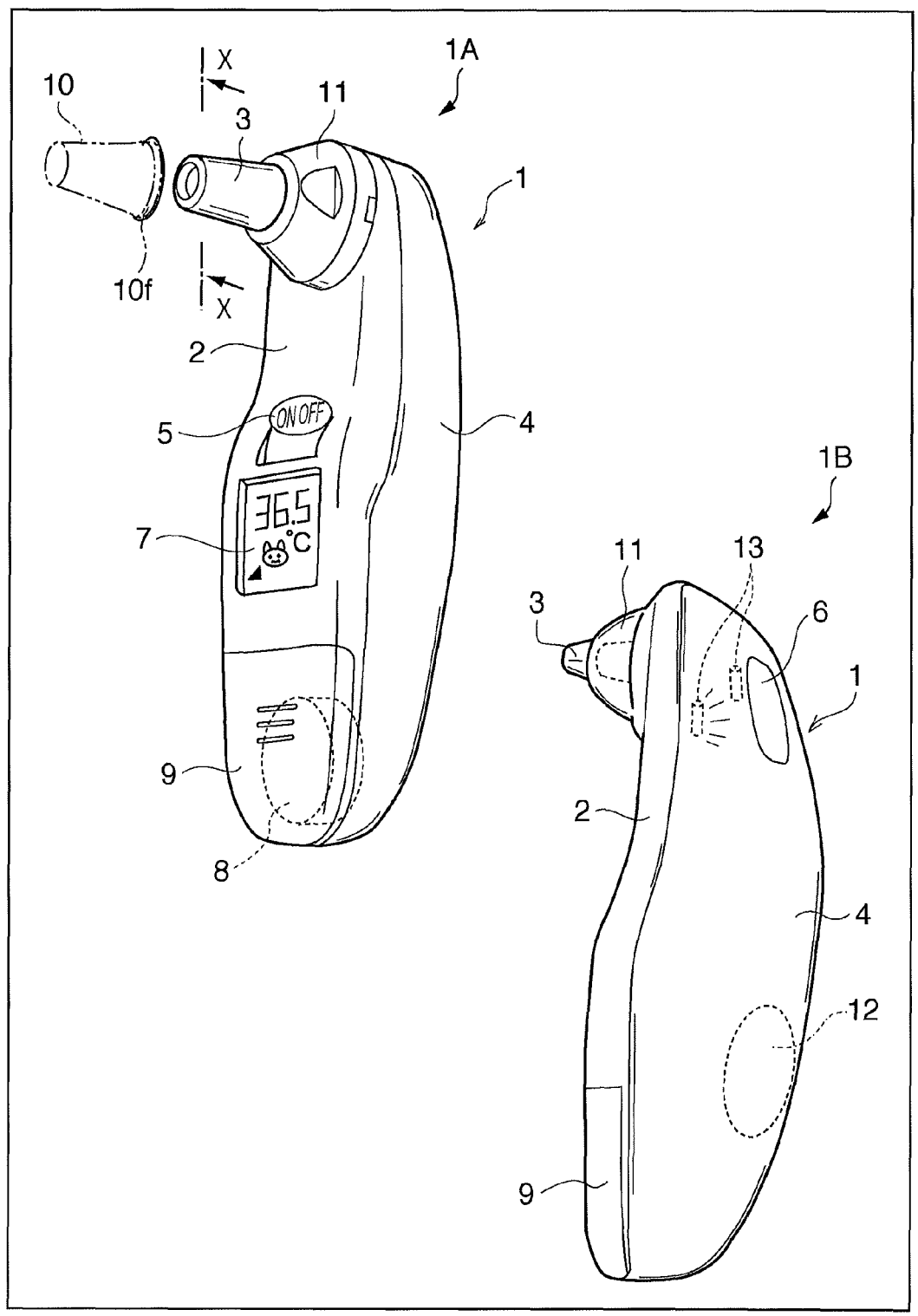
FIG. 1 shows a perspective view of the exterior of an ear-type thermometer 1 according to a first embodiment of the present invention seen from the probe side (1A), and from the operation switch side (1B).

EXPLANATION OF REFERENCE NUMERALS 1 ear-type thermometer
2 main body base
3 probe
4 main body cover
5 power switch
6 measurement switch
7 liquid crystal display unit
8 button battery
9 button battery cover
10 probe cover
11 probe cover attachment tool
12 speaker
13 LED element
15 mounting board
20 detection element housing
21 temperature detection element
22 infrared detection element
23 mounting base member
24 hole
25 container member
26 window member
28 lead port
30 wire
31 opening
32 end face
33 locking part
34 inner side surface
60 probe cover detection switch (detection means)

BEST MODE FOR CARRYING OUT INVENTION

Embodiments of the present invention will be explained below with reference to accompanying figures.

In FIG. 1, 1A is an external perspective view of an ear-type thermometer 1 of an embodiment of the present invention seen from the probe side. And, 1B is an external perspective view of the ear-type thermometer seen from an operation switch 5 side.

In these figures, the ear-type thermometer 1 has the design and weight which allow easy operation by one hand. For this reason, the ear-type thermometer 1 is divided into a main body base 2 and a main body cover 4 which are made by injection molding with a particular resin material, and is structured such that a mounting board to be discussed later can be fixed in the interior. Further, the main body base 2 and the main body cover 4 are formed from resin materials stained in different colors. In particular, the main body cover 4 is made from a semi-transparent resin, and is structured to allow viewing of blinking of two, internally placed light emitting LED elements 13 from the outside. As for resin materials that can be used, so-called engineering plastic including polyethylene, polypropylene, polyolefins such as ethylene-vinyl acetate polymer, and polyesters including polyethylene terephthalate and polybutylene terephthalate, can be thought of.

A probe 3, which is inserted into the aural cavity (auditory canal) in order to detect infrared light emitted from a temperature measurement site (in particular, preferably the ear drum and/or its periphery) within the aural cavity, is formed as a conical cylinder with its tip having an external diameter of approximately 7 mm, and is integrally molded as a single unit with the above-mentioned main body base 2. This probe 3 can also be prepared as a separate component from the main body base 2, which simplifies an imposition step that will be explained later.

With reference to FIG. 1 (1A), a probe cover 10, shown in dash-dotted line and has a shape identical to a part of the probe 3, is removably attached to the probe 3. This probe cover 10 prevents ear wax and other foreign matters from entering through the opening and into the probe 3, and is designed to be washable in alcohol and water on a regular basis when removed in order to maintain good hygienic condition. This probe cover 10 is typically prepared from polyethylene or polypropylene, olefin-type resins that transmit infrared light, to a predetermined thickness of, for example, 0.1 to 0.005 mm by vacuum molding. However, other types of resin materials can also be used.

Flange portion 10f is integrally molded on the probe cover 10 as shown in the figure, and the probe cover 10 is removably attached to the probe 3 by having the flange portion held in place with a probe cover attachment tool 11 as will be explained later. Further, the probe cover attachment tool 11 has a tapered shape with a diameter larger than the base of the probe 3 as shown in the figure, in order to prevent over-insertion of the probe 3 into the aural cavity at the probe cover attachment tool 11.

In FIG. 1(1A), a button for a power switch 5 that can be pressed for operation is placed below the probe 3. Also, below this power switch 5 a liquid crystal display unit 7 is placed which displays measured temperature using 7 segments, and characters such as icons which indicate the stand-by condition just before starting measurement. Placed below this liquid crystal display unit 7 is a button battery cover 9 which can be removed from and attached to the main body base 2 when replacing a button battery 8 shown in dotted line.

On the other hand, in FIG. 1(1B), a measurement switch 6 is placed at a location on the main body cover 4 which is approximately the back side of the probe 3. Further, a piezoelectric speaker 12 shown in dotted line is fixed on the back side surface of the main body cover 4.

Figure 2:
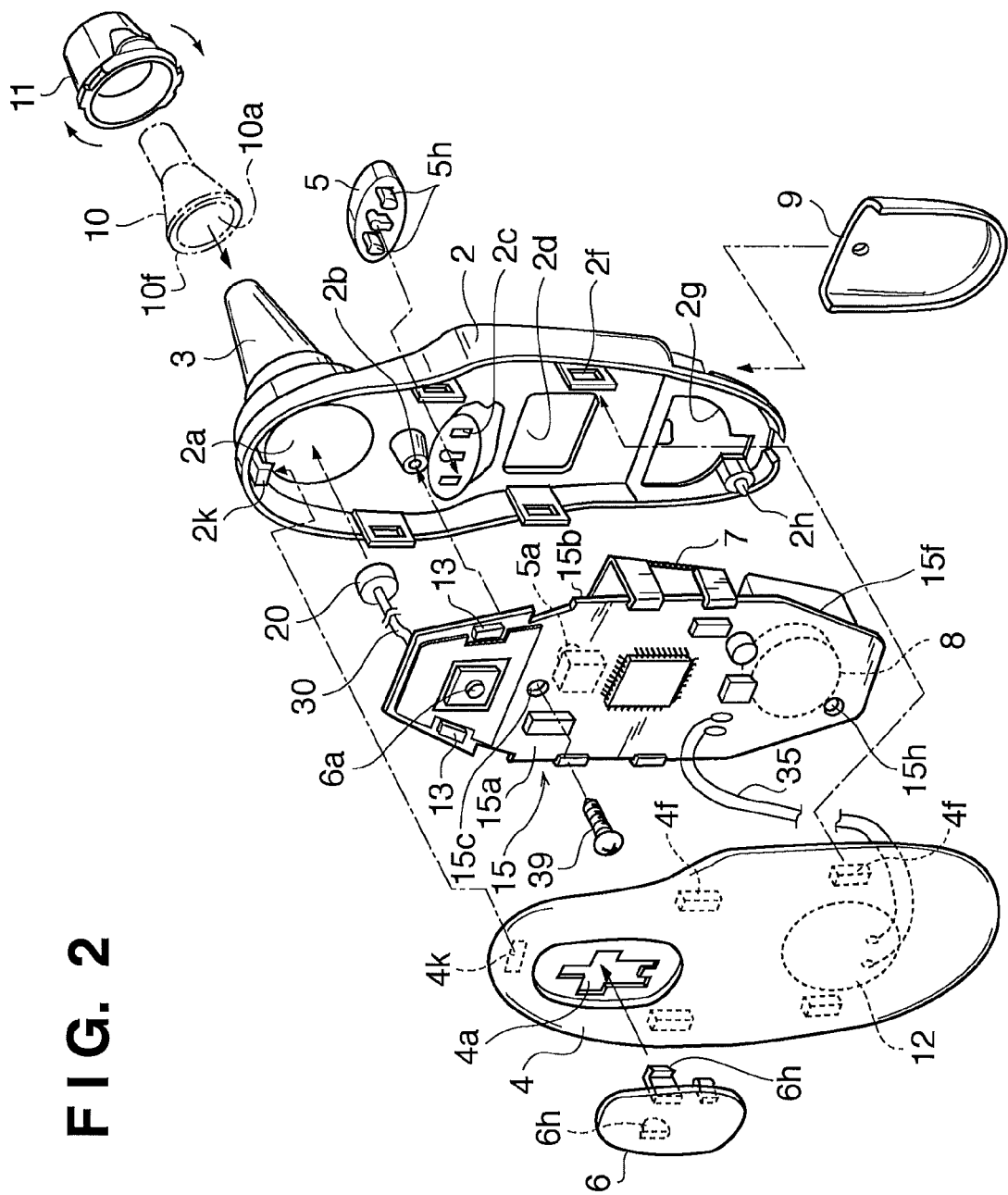
FIG. 2 is an exploded view of the ear-type thermometer shown in FIG. 1.

FIG. 2 is an exploded view of the ear-type thermometer shown in FIG. 1. In this figure, structures which are already explained and their parts are assigned the same numbers. On the main body cover 4, there is a depressed portion formed with an opening 4a which is to fix the measurement switch 6 in place. By inserting a pair of hooks 6h into the opening 4a and engaging them onto the edges of the back surface of the opening 4a, the measurement switch 6 is retained and fixed in place. After fixation, the measurement switch 6 can be moved back and forth in relation to the main body cover 4, which enables pressing and operating of a mechanical contact switch 6a that includes a tact switch mounted on a main mounting surface 15a of a mounting board 15. Further, on the back side of the main body cover 4, the piezoelectric speaker 12 shown in dotted line is fixed in advance, and wires 35 to the speaker 12 extend from the main mounting surface 15a of the mounting board 15.

In proximity to the edges of the inner perimeter surface of the main body cover 4, there are 4 pieces of protrusions 4f shown in dotted line symmetrically placed. Further, there is a hook-catching part 4k formed at the top. On the other hand, the main body base 2 forms edges which are identical in shape to the edges of the main body cover 4, and has integrally molded depressions 2f at locations corresponding to the protrusions 4f, each having a groove into which the respective protrusion 4f fit. Further, the upper portion of the main body base 2 has an integrally molded hook 2k which locks into the hook catching part 4k.

With the structures described above, it is possible to put together the main body cover 4 and the main body base 2 without using any adhesive or screws, first by engaging the hooks 2k into the hook catching part 4k which determine relative positions of the two pieces, and subsequently engaging each of the protrusions 4f into their respective depressions 2f.

Because the mounting board 15 is fixed onto the interior of the main body base 2 which is surrounded by edges, it has a shaped portion 15f which is of a similar shape that approximately traces the edge walls of the main body base 2 as shown in the figure. On the main mounting surface 15a of the mounting board 15, the above-mentioned LED elements 13, a CPU element, and various types of electronic components are mounted. Further, on a sub-mounting surface 15b on the back side of the mounting board 15, a mechanical switch 5a shown in dotted line, the above-mentioned liquid crystal display unit and a battery box into which the button battery 8 is set, are mounted. Further, wires 30 connected to a detection element housing 20, to be explained later, are also connected to this sub-mounting surface 15b.

A screw hole 15c and a fixation hole 15h, for fixing the mounting board 15 onto the main body base 2, are respectively drilled at positions indicated in the figure. On the other hand, attachment studs 2b and 2h are integrally molded on the main body base 2 at positions that correspond to the screw hole 15c and the fixation hole 15h. The two attachment studs are configured such that the mounting board 15 can be fixed onto the main body base 2 by aligning the screw hole 15c and fixation hole 15 onto the studs and screwing a screw 39 into the attachment stud 2b. In order to integrally mold the main body base 2 and the probe 3 together, an opening 2a, which is connected to the inner perimeter surface of the probe 3, is formed.

On the main body cover 2, a depression having holes 2c for fixing the power switch 5 in place is formed. By inserting a pair of hooks 5h formed on the power switch 5 into the holes 2c and engaging the hooks onto the back side of edges of the holes 2c, the switch is retained in place. After fixing the switch in place, the power switch 5 can be moved back and forth in relation to the main body base 2, which enables pressing and operating of a mechanical switch 5a, a tact switch mounted onto the sub-mounting surface 15b of the mounting board 15.

Further, on the main body cover 2, an opening 2d is formed which correspond to the location of the liquid crystal display unit 7. Also, in order to allow replacement of the button battery 8, an opening 2g which is larger than the external dimensions of the button battery 8 is formed, and a button battery cover 9 which covers this opening 2g is slidably attached.

As explained above, by fixing, on the main body cover 2, the mounting board 15 onto which various components are mounted, and subsequently engaging the main body cover 4, assembly is completed.

On the other hand, the probe cover 10 is set onto the probe 3 in the direction indicated by an arrow such that it covers the probe. Subsequently, the probe cover can be fixed in place by placing the probe attachment tool 11 and turning it in a direction indicated by the two arrows.

Figure 3:
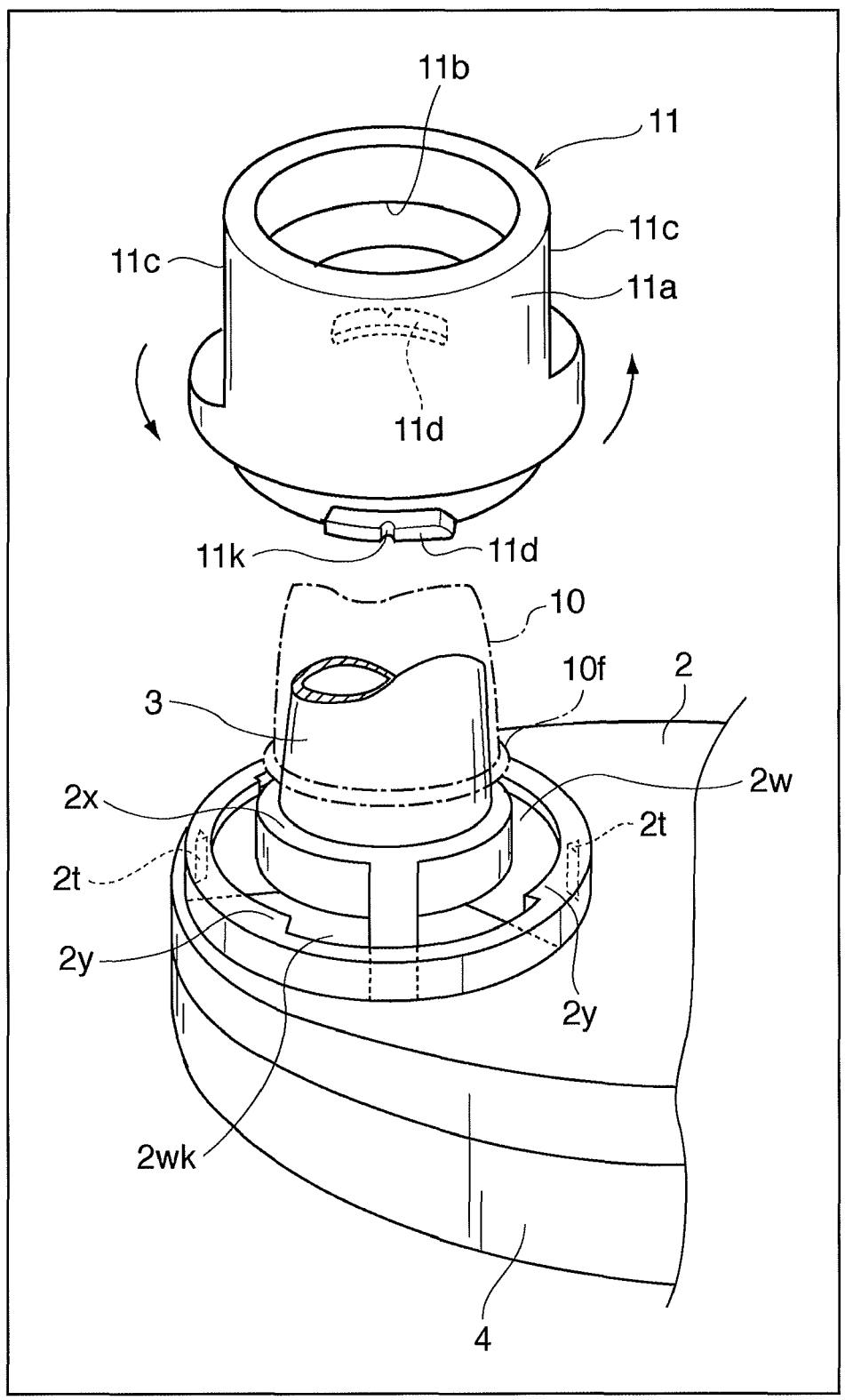
FIG. 3 is a diagram which explains operation of a probe cover attachment tool 11 which attaches a probe cover 10.

FIG. 3 is a diagram which explains the relationship between the probe cover attachment tool 11 for removably attaching the probe cover 10 and the probe 3 which is integrally molded with the main body base 2. In this figure, the probe cover attachment tool 11 is prepared by injection molding as a cylindrical member using a resin material of a color different from that of the main body base 2, forming an opening which has a step 11b that makes contact with the flange portion 10f of the probe cover 10 (shown in dotted lines) and holds the cover in place. On the outer perimeter surface of this probe attachment tool 11, there are gripping portions 11c placed symmetrically which are gripped by finger tips and allow the probe attachment tool to be turned in the direction indicated by arrows.

Further, at locations which are at 90° from the gripping portions 11c, there are locking protrusions 11d (one is shown in dotted lines) formed to protrude towards the outside. Further, in the center of each locking protrusion 11d, a locking groove 11k is formed.

On the other hand, a step 2x, which makes contact with the bottom surface of the flange 10f of the probe cover 10 (shown in dotted and dashed lines) at a location corresponding to the bottom of the probe 3, is integrally formed on the main body cover 2 and is concentric with the probe 3. Further, inner sleeves 2y are integrally formed to surround the step 2x, with a gap 2w in between themselves and the step 2x and being concentric with the probe 3. At the center of these inner sleeves 2y, there are protrusions 2t shown in dotted lines which lock into the locking grooves 11k positioned at the center of the locking protrusions 11d.

According to the above-discussed structure, the probe 3 is covered with the probe cover 10, and the probe cover attachment tool 11 is lowered onto the probe 3 by gripping it at the gripping portions 11c. By inserting locking protrusions 11d (one is shown in dotted lines) into large radius gaps 2wk in between the inner sleeves 2y and turning the attachment tool 11 counter-clockwise, the locking grooves 11k at the center of locking protrusions 11d are locked onto the protrusions 2t, preventing probe 3 from being released.

Figure 4:
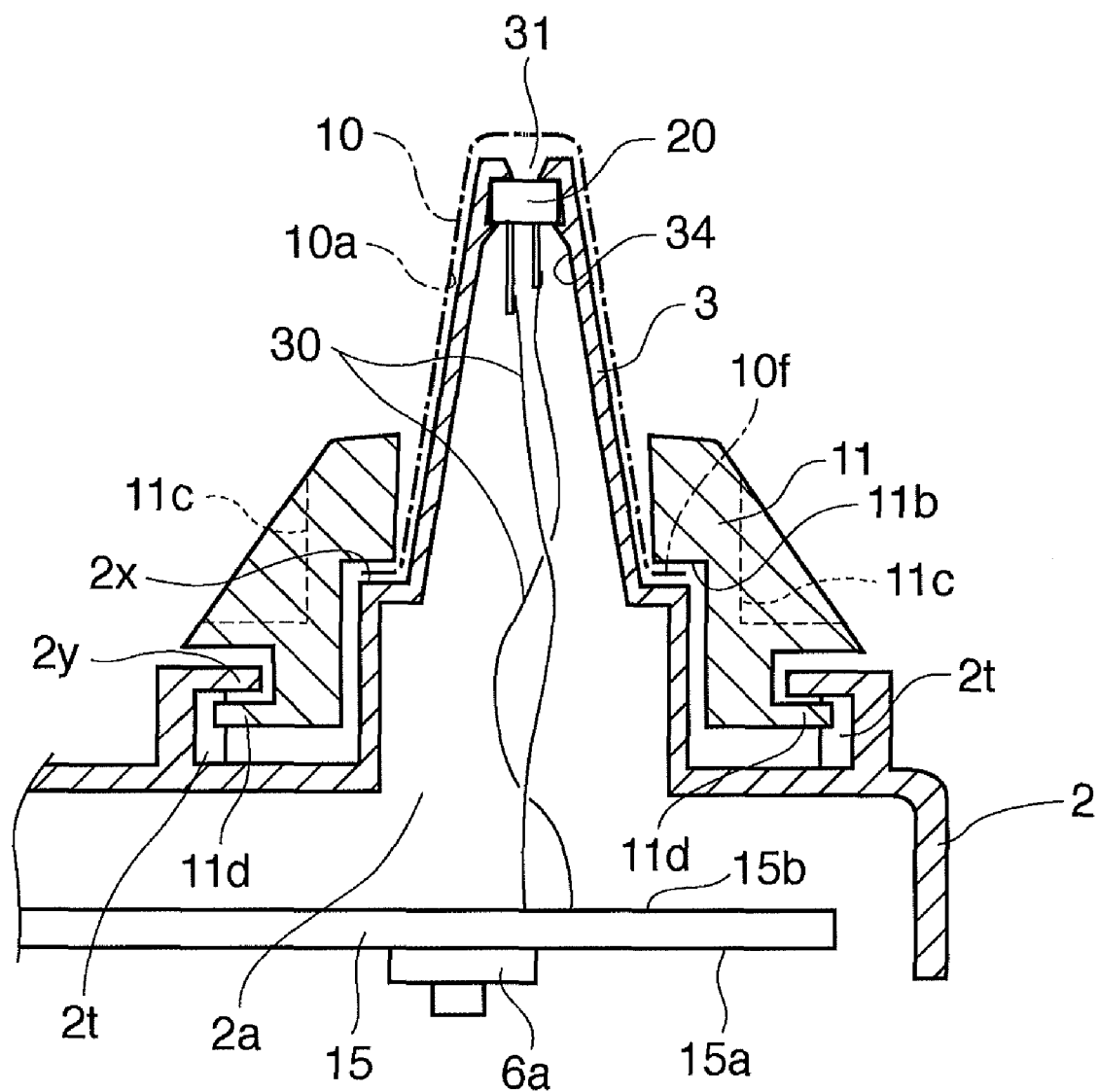
FIG. 4 is a cross-section view along X-X surface shown in FIG. 1 (1A) after attachment of the probe cover 10.

With the operation described above, the state depicted in the cross section diagram of FIG. 1 following attachment of the probe cover 10 of FIG. 4 is achieved. In other words, as shown in FIG. 4, by having the bottom surface of the flange portion 10f of the probe cover 10 (shown in a dotted-dashed line) make contact with the step 2x, and the top surface of the flange portion 10f make contact with the step 11b of the probe cover attachment tool 11, the probe cover 10 is sandwiched from above and below. Further, for example when the probe cover 10 is to be removed for cleaning in water, the above-described operation is performed in reverse.

As depicted in the cross-section diagram of FIG. 4, probe 3 is formed with the end face which is configured to have the opening 31 at its tip, the inner side surface having a hollow cylindrical shape and is continuous with the opening 2a of the main body base 2. The detection element housing 20 is fixed at the tip of the probe 3 which is formed as depicted in the figure, and this detection element housing 20 is connected to the mounting board 15 via wires 30. Alternatively, a connector which is not shown in the figure is used for making the connection to perform body temperature measurement to be discussed later.

The outer diameter of the tip of the probe 3 is approximately 7 mm, due to the fact that it has to be inserted into the outer ear. For this reason, in order to fix the detection element housing 20 at the position indicated in the figure, the outer diameter of the housing 20 is set to be 5 mm and its height is set to be around 4 mm.

Figure 5:
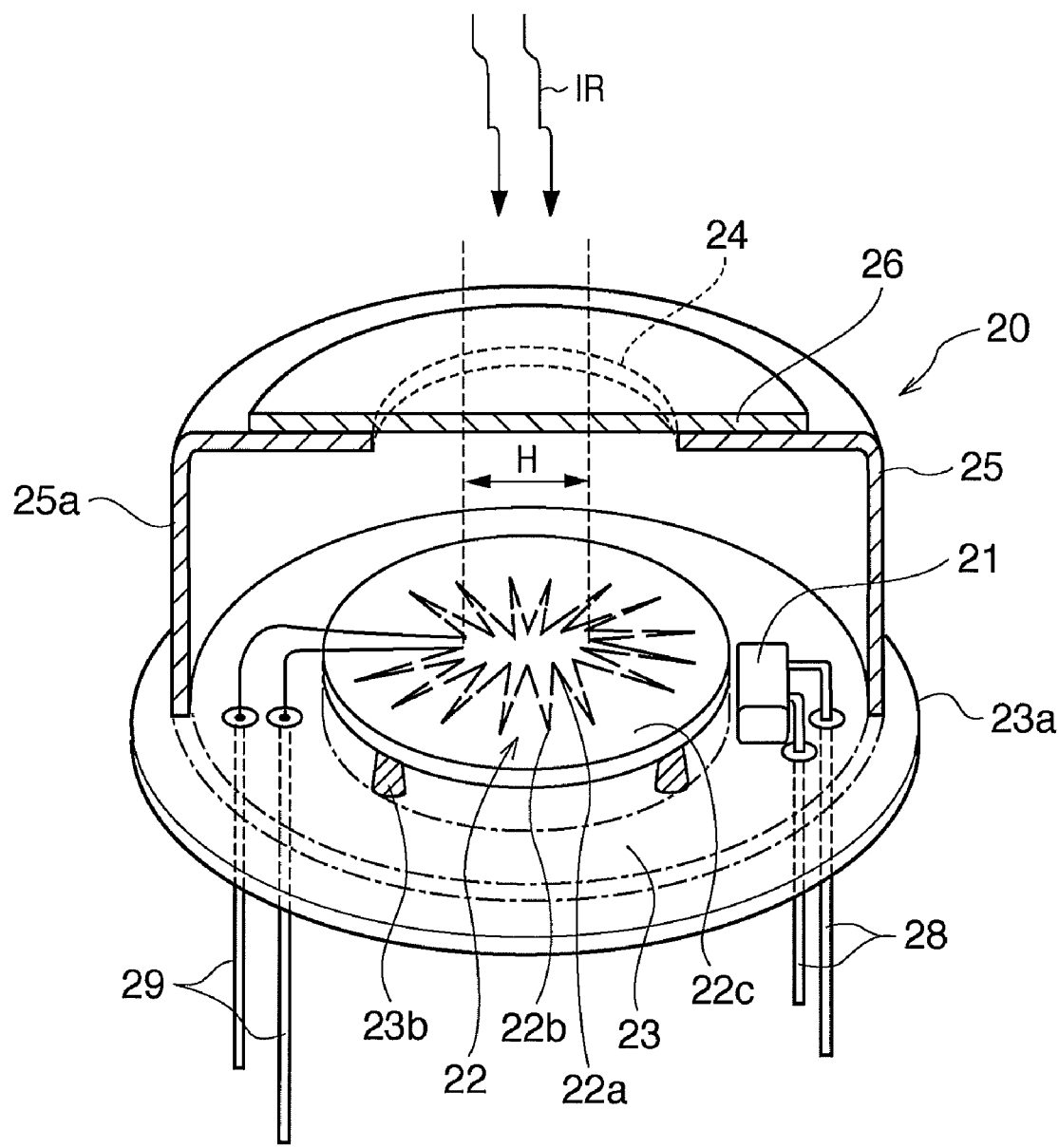
FIG. 5 is an external perspective view of a part of a detection element housing 20.

FIG. 5 is an external perspective view of the detection element housing 20 wherein a part of the housing 20 is removed for view into the interior. In the detection element housing 20 of this figure, a thermistor 21 which is a temperature detection element that detects ambient temperature, an infrared detection element 22 which detects infrared light emitted from the temperature measurement site within the aural cavity, are mounted on a mounting member 23. The thermistor 21 which is fixed in such a manner, has been tweaked during the production stage to be able to measure ambient temperature of the usage environment, which is an absolute temperature. For this reason, the mounting member 23 is made from a material which is a good conductor such as aluminum, which allows transmittance of external temperature and fixes the thermistor 21 to make its mounting surface large. Lead wires of the thermistor 21 are connected to electrode leads 28 which are fixed in place on and insulated from the mounting member 23.

On the other hand, the infrared detection element 22 which detects infrared radiation (IR) is not capable of detecting absolute temperature but can only detect relative temperature change. For this reason, body temperature is attained by adding the temperature detected by the infrared detection element to the temperature detected by the temperature detection element. Details of such detection operation is explained in, for example, Japanese Patent Laid-Open No. H11-123179, and will be omitted here.

In FIG. 5, since the infrared detection element 22 preferably is a thermocouple-type (thermopile type) device, it is comprised of hot junctions 22a and cold junctions 22b forming the shape of petals of a flower on top of a wafer substrate 22c fixed on legs 23b of the mounting member 23. Each of the hot junctions and cold junctions are formed with different types of metals and are connected in series, and lead wires are connected to the electrode leads 29 which are fixed to and insulated from the mounting member 23, as depicted in the figure. Further, an area H which are surrounded by the hot junctions 22a is painted in black to facilitate absorption of infrared radiation, allowing generation of electromotive force at each of the junctions to detect relative temperature change.

The semi-cross-section of FIG. 5 depicts a container member 25 having a cylindrical shape with an outer perimeter surface 25a on its sidewall, a hole 24 on its ceiling plane and surrounding the two detection elements. This container member 25 is also made of a metal with good conductance such as aluminum and stainless steel, like the mounting member 23, and allows the external temperature to be transmitted to the thermistor 21. Further, a window member 26 made from a silicon material which lets through infrared light is fixed on the hole 24, and comprises the detection element housing 20.

According to the detection element housing 20 depicted in the figure, the mounting member 23 has a radially extending outer sleeve 23a formed along its entire perimeter, the backside of which is used as fixation portion. However, the detection element housing 20 can be configured with a mounting member 23 without the sleeve 23a and having the same diameter as the outer perimeter surface 25a of the container member 25. Further, at least 2 protrusions in radial direction can be formed.

Figure 6:
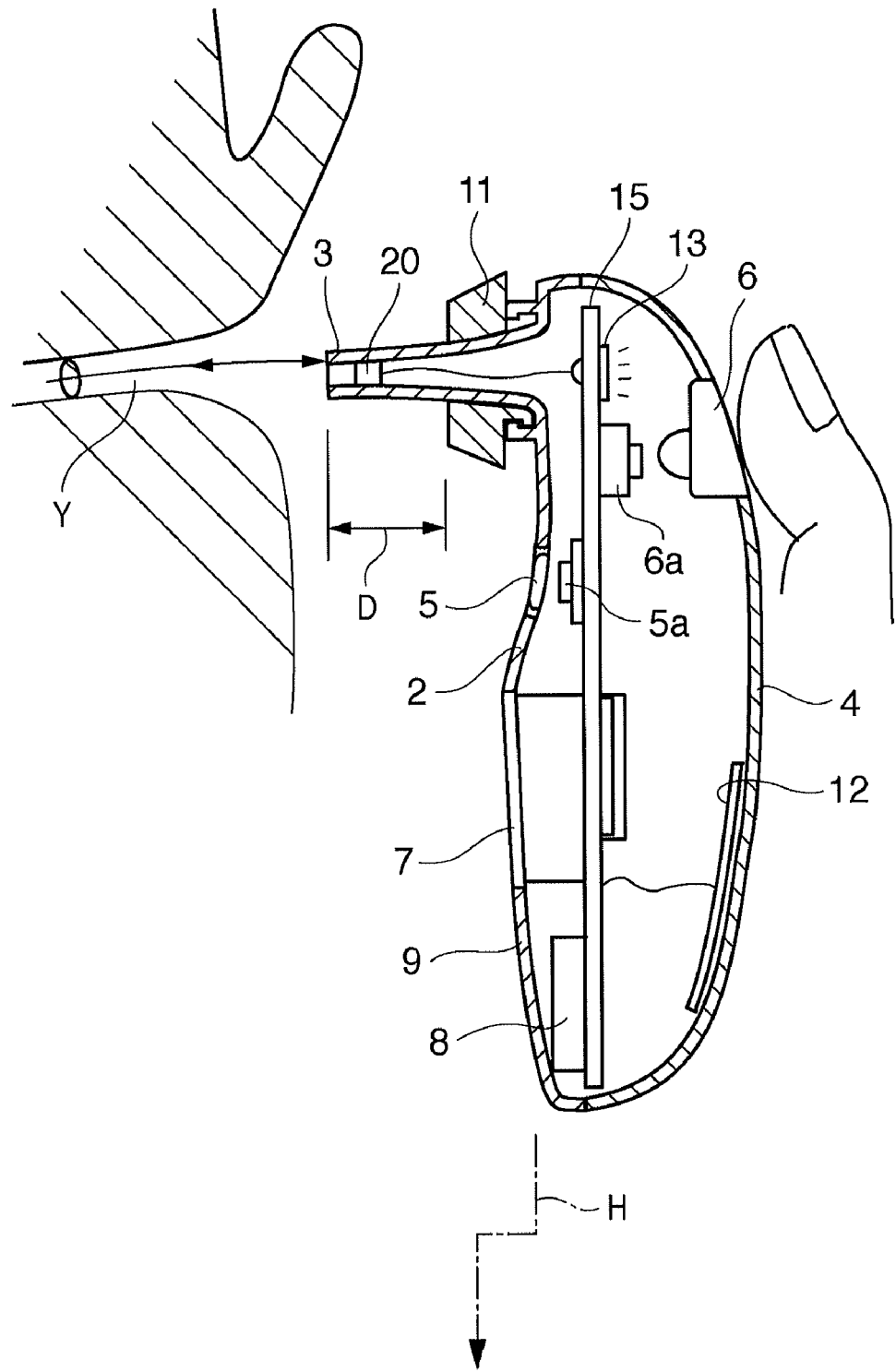
FIG. 6 is a cross-section view in which the ear-type thermometer 1 is being inserted to a measurement site.

FIG. 6 is a cross-section view in which the ear-type thermometer 1 is being inserted to aural cavity Y which is a measurement site. In this figure, parts that are already explained will be assigned the same numbers as before and their explanations will be omitted. When the power switch 5 is turned on, the ear-type thermometer 1 remains in a standby until the ambient temperature is detected by the thermistor 21. The standby time for this measurement is the time required for display of an icon to be completed on the liquid crystal display unit 7. After the standby time has elapsed, the probe 3 is to be inserted into the aural cavity Y as illustrated. When doing so, over-insertion into the aural cavity is prevented by a distance Y between the probe cover attachment tool 11 and the tip of the probe.

After insertion, by pressing the measurement switch 6 the LED elements 13 will flash in sequence, and the speaker 12 will generate a beep notifying completion of measurement. Subsequently, body temperature is displayed on the liquid crystal display unit 7 for user to see. In particular, since the measurement switch 6 is placed on the opposite side from the probe 3, the design allows easy understanding of where the probe 3 is to be inserted into when one is measuring body temperature of oneself. Further, when the thermometer 1 is left with the power switch 5 turned on, the power automatically turns off, preventing consumption of battery.

Figure 7:
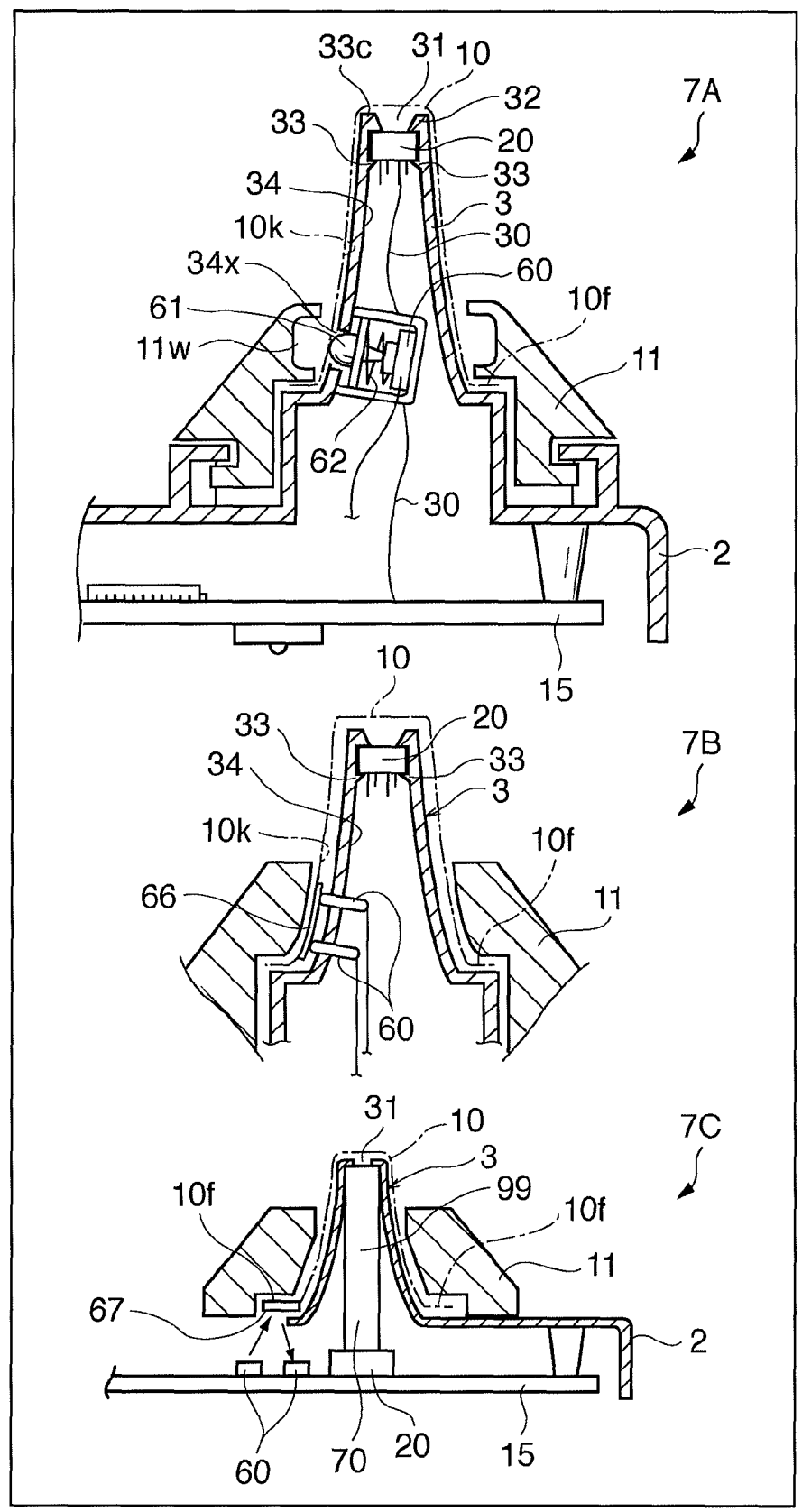
FIG. 7 shows a cross-section view showing placement of a mechanical contact switch as a probe cover detection switch 60 that functions when contact is made against an inner perimeter surface 10k of the probe cover 10 (7A), a cross-section view showing placement of an electrical contact switch as the probe cover detection switch 60 placed on an inner side surface 34 of a probe 3 that functions when contact is made against a conductive layer 66 laid on the inner perimeter surface 10k of the probe cover 10 (7B), and a cross-section view showing placement of an optical switch as the probe cover detection switch 60 comprising a light-guiding tube 99 between a probe opening 31 and a hole 24 and detects a reflective layer 67 laid out on a flange portion 10f of the probe cover 10 using reflected light (7C).

FIG. 7 shows cross-sections depicting examples of a probe cover detection switch 60 which detects presence and absence of the probe cover 10. FIG. 7 (7A) shows usage of a mechanical contact switch operates by making contact with the inner perimeter surface 10k of the probe cover 10 as the probe cover detection switch 60. FIG. 7 (7B) shows use of an electric contact switch as the probe cover detection switch 60 placed on the inner side surface 34 of the probe 3 which operates by making contact with a conductive layer 66 laid on the inner perimeter surface 10k of the probe cover. FIG. 7 (7C) shows use of an optical switch as the probe cover detection switch 60, wherein a light guiding tube 99 is placed between the opening 31 of the probe and the detection element housing 20 and wherein the optical switch detects a reflection layer 67 laid on the flange portion 10f of the probe cover 10 using light reflection.

First, in FIG. 7 (7A), by inserting the detection element housing 20 into the probe 3 such that the opening 31 gets blocked, the window member 26 of the detection element housing 20 is placed towards the top as shown in the figure, and the back surface of the mounting member 23 locks with the locking part 33 and fixes the housing 20 in place. The opening 31 of the probe 3 is formed at the top portion of a chamfered surface 32c at the end face 32 of the probe 3 as shown in the figure, and is integrally molded in the shape of a circle with a diameter of approximately 3 to 4 mm.

This end face 32 is formed as an inner flange portion which protrudes inwards from the inner side surface 34, and forms a flat ring-shaped inner wall. Grooves (not shown) having an outer diameter which is smaller than the inner diameter of the inner side surface 34 may be formed on this inner wall, which holds an O-ring that works as a sealing member (not shown).

On the other hand, in order to form the height of the end face 32 reaches the height in which the height of the window member 26 is added to the height of the outer perimeter surface 25a of the container member 25 of the detection element housing 20 explained using FIG. 5, 3 locking parts 33 of a height of about 1 to 2 mm are formed at locations separated from the inner wall separated by 120° from each other. These locking parts 33 can be formed as a continuous structure that spans the entire circumference, or can be formed at 2 or more than 4 locations.

In the structure described above, the detection element housing 20 connected with wires 30 to the electrode leads 28 and 29 and the back side of the mounting board 23 is moved upwards using a tool not shown in the figure, the edges of the container member 25 makes contact with the slanted surfaces of the locking parts 33. If the housing 20 is moved further upward, the outer perimeter surface 25a of the container member 25 is guided by the top of the locking parts 33, and the sleeve 23a of the mounting member 23 (refer to FIG. 5) makes contact with the slanted surface. If the housing 20 is moved even further upwards, the edge of the sleeve 23a is pushed into the slanted surface of the locking parts, and elastically deforms the probe 3 in the radial direction. When further moved up, the surface of the window member 26 of the detection element housing 20 makes contact with the end face 32 such that it blocks the opening 31 of the probe 3 as shown in FIG. 7(7A). Further, when using an O-ring (gasket), the portion protruding out of the groove is elastically deformed, allowing maintenance of a liquid-tight state.

On the inner side surface 34 of the probe 3, a hole 34x is drilled, and an actuator member 61 is placed which protrudes out of this hole in a radial direction. This actuator member 61 is placed such that it protrudes to the outside by the action of a compressed coil spring 62 which is inserted in between the actuator member 61 and a tact switch, a mechanical contact switch acting as the probe cover detection switch 60. On the other hand, a depression 11w is provided on the probe cover attachment tool 11 in order to accommodate the tip of the actuator member 61 at a protruded position when there is no probe cover 10. According above-discussed structure, when the probe cover attachment tool 11 is set as discussed above and sandwich the flange portion 10f of the probe cover, the actuator member 61 makes contact against the inner perimeter surface 10k of the probe cover 10 and presses the probe cover detection switch 60. Further, when probe cover 10 is not set, the actuator member 61 moves to the protruded position by the action of the compressed coil spring 62, and the probe cover detection switch 60 is released from the pressed state.

As described above, utilizing the space that is generated from placing the detection element housing 20 at the tip of the probe 3, it is possible to make accurate detection of presence/absence of a probe cover 10.

For FIG. 7(7B), parts that are already explained will be assigned the same numbers as before and their explanations will be omitted. In this figure, on the inner side surface 34 a pair of electric contact points is provided as the probe cover detection switch 60. At the same time, a conductive layer 66 having a ring shape is laid on the inner perimeter surface 10k of the probe cover, and when the probe cover 10 is set as shown in the figure the pair of electric contacts are connected and conducts electricity, allowing detection of presence of the probe cover. When there is no probe cover 10, electricity is not conducted, and it is possible to detect absence of the cover.

In FIG. 7(7C), the light guiding tube 99 comprising a gold gilt cover reflective surface 70 is placed between the opening of the probe 3 and the hole 24 of the detection element housing 20. Further, an optical switch which detects the reflective layer 67 laid on the flange portion 10f of the probe cover 10 using reflected light, is placed on the mounting board 15 as a probe cover detection switch 60.

In the structure described above, when the probe cover 10 is set as shown in the figure and light from a light emitting element is reflected off the reflective layer 67 which is detected by a light receiving element, it is possible to detect that a probe cover is present. When there is no probe cover 10, no reflection of light occurs, and absence of probe cover is detected.

Figure 8:
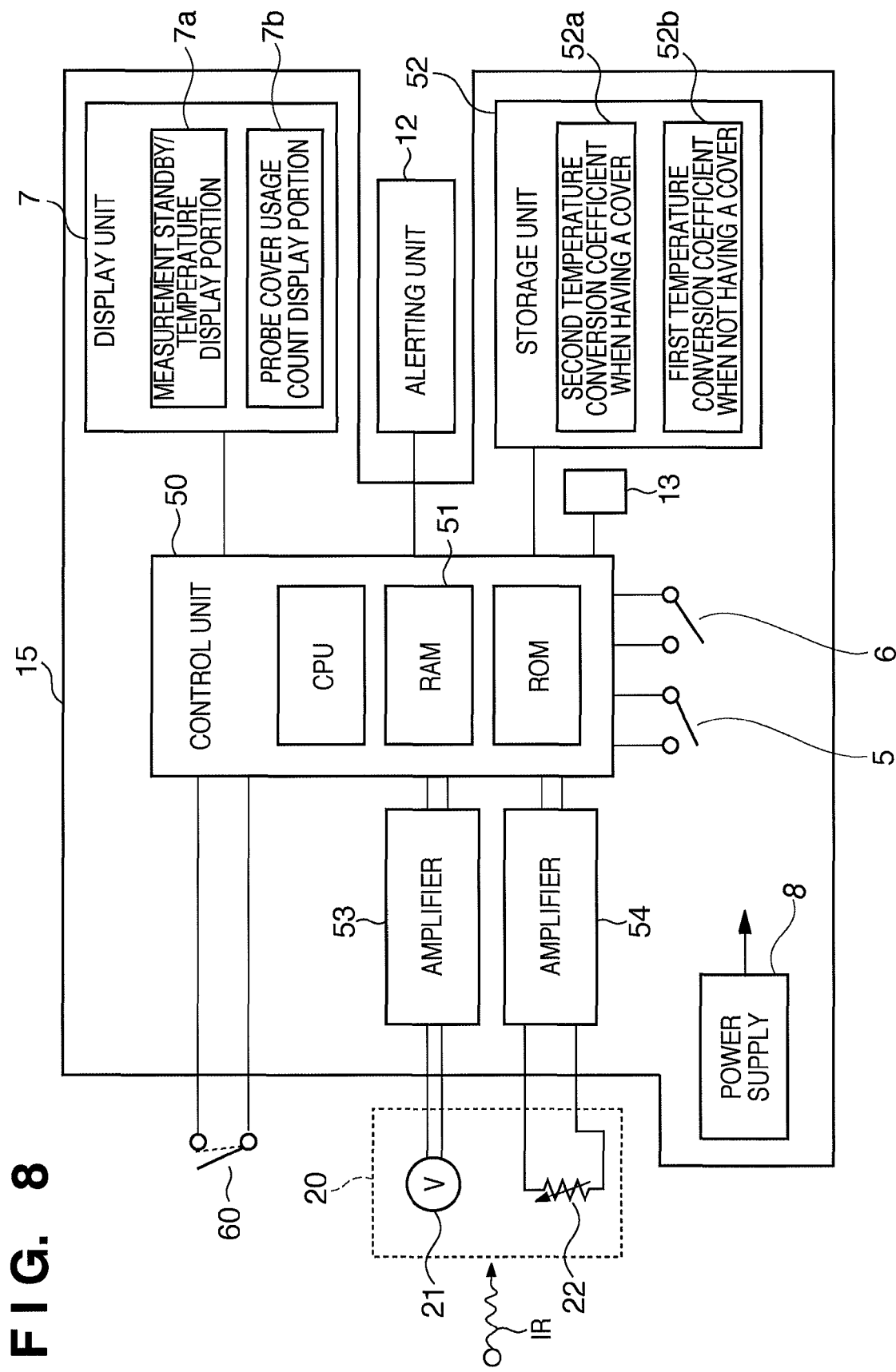
FIG. 8 is a block diagram of the ear-type thermometer 1.

FIG. 8 is a block diagram of the ear-type thermometer 1. Parts that are already explained will be assigned the same numbers as before and their explanations will be omitted. The thermistor 21, which is installed in the detection element housing 20 depicted in dotted line in the figure, is connected via the wires 30 to an amplifier 53 mounted on the mounting board 15. Also, the infrared detection element 22 which detects infrared radiation IR is connected via the wires 30 to an amplifier 54 mounted on the mounting board 15.

Further, the probe cover detection switch 60 is connected to a port of a control unit 50 mounted on the mounting board 15. The control unit 50 mounted on the mounting board 15 comprises a CPU element, a RAM 51 (Random Access Memory) which is a storage element and a storage unit 52 comprised of a ROM (read only memory). This storage unit 52 comprises a storage unit 52a for storing a second temperature conversion coefficient for when there is no probe cover, and a storage unit 52b for storing a first temperature conversion coefficient for when there is a probe cover. The first and second temperature conversion coefficients are calculated by the temperature calibration with the probe cover on and probe cover off, respectively, and these temperature conversion coefficients are calculated by the temperature calibration which calculates correlation coefficient between the detected body temperature signals based on detection results of the two detection elements and actual body temperature signals based on actual body temperature, and these temperature conversion coefficients are used for measuring correct body temperature by correction which perform temperature conversion by the temperature calibration.

Further, the control unit 50 is connected to the LED element 13, the liquid crystal display unit 7 having a standby and temperature displaying parts, the speaker 12 which a warning unit, the power switch 5, and the measurement switch 6. Further, it is structured to be supplied with electric power from the power supply 8 which is the button battery. Further, the liquid crystal display unit 7 has a measurement standby/temperature display portion 7a and a probe cover usage count display portion 7b.

An exemplary control method for controlling the ear-type thermometer having the above-described configuration by detecting presence/absence of the probe cover and performing correction based on the detection results in order to eliminate errors in body temperature measurement result, will be explained with reference to an accompanying explanatory flow chart.

Figure 9:
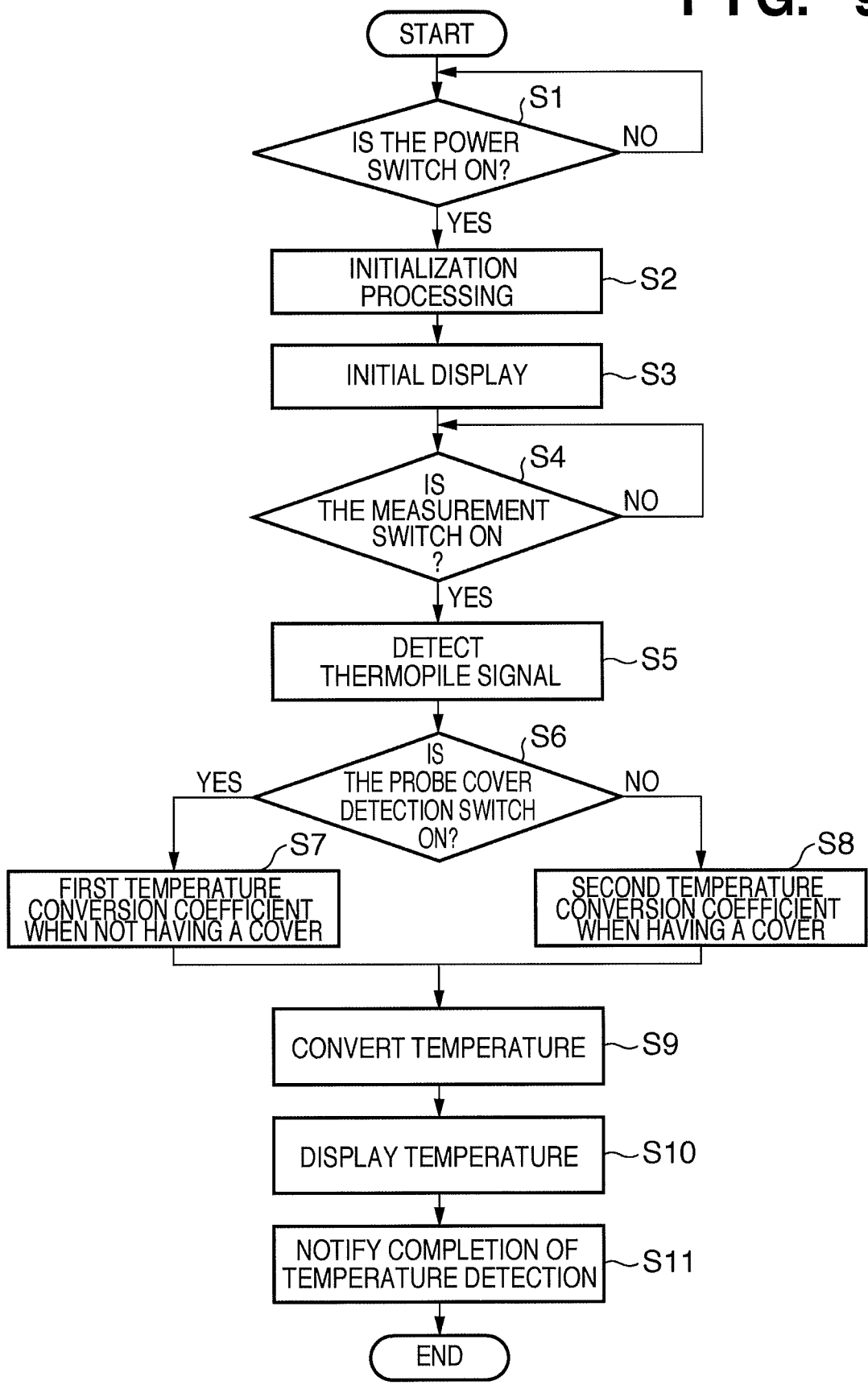
FIG. 9 is a flowchart explaining operation of a main routine program.

FIG. 9 is a flow chart which explains operation of a main routine program. In this figure, turning on of the power switch 5 is waited for to be turned on at step S1. When the power switch 5 is turned on, the process moves to step S2 and the main routine is started, in which initialization processing such as reading out cover usage count from the storage unit and displaying the usage count on the display portion 7b. Subsequently the process moves to step S3, and in order to indicate that the process is currently at a standby status prior to measurement, for example, an icon or a character is displayed gradually on the display portion 7a, starting from a small part, over a period of time that is required to complete the icon or character during which the standby status continues. During this time, measurement of ambient temperature by the thermistor 21 is performed.

Subsequently, at step S4, the measurement switch 6 is waited for to be turned on. When it is determined that the measurement switch 6 is pressed at step S4, the process advances to step S5 and detects electronic temperature signals from each of the detector elements 22. Then, at step S6 it is checked whether the probe cover detection switch 60 is turned on or not. When the probe cover detection switch 60 is determined to be in a turned-on state at step S6, it is determined that the probe cover 10 is properly attached, and the process advances to step S7 and reads the first temperature conversion coefficient. Then the process advances to S9 and obtains a body temperature by temperature conversion based on the first temperature conversion coefficient which was read at step S7. Next, at step S10, display of body temperature on the display portion 7a is performed. And at step S11, a notice of completion of body temperature is performed, and the processing finishes.

On the other hand, if it is determined at step S6 that the probe cover detection switch 60 is in a turned-off state, the probe cover 10 is determined not to be attached, in which case the process advances to step S8 and reads the second temperature conversion coefficient from the storage unit 52a. Subsequently, the process advances to step S9, in which a body temperature is obtained by temperature conversion based on the read second temperature conversion coefficient. Then at step S10, the body temperature is displayed on the display portion 7a. And at step S11, a notice of completion of body temperature is performed, and the processing finishes. At this point, when the usage count of the probe cover is determined to have exceeded the usage count limit of, for example, 50 times, then an instruction to replace the cover is displayed on the display portion 7b.

Figure 10:
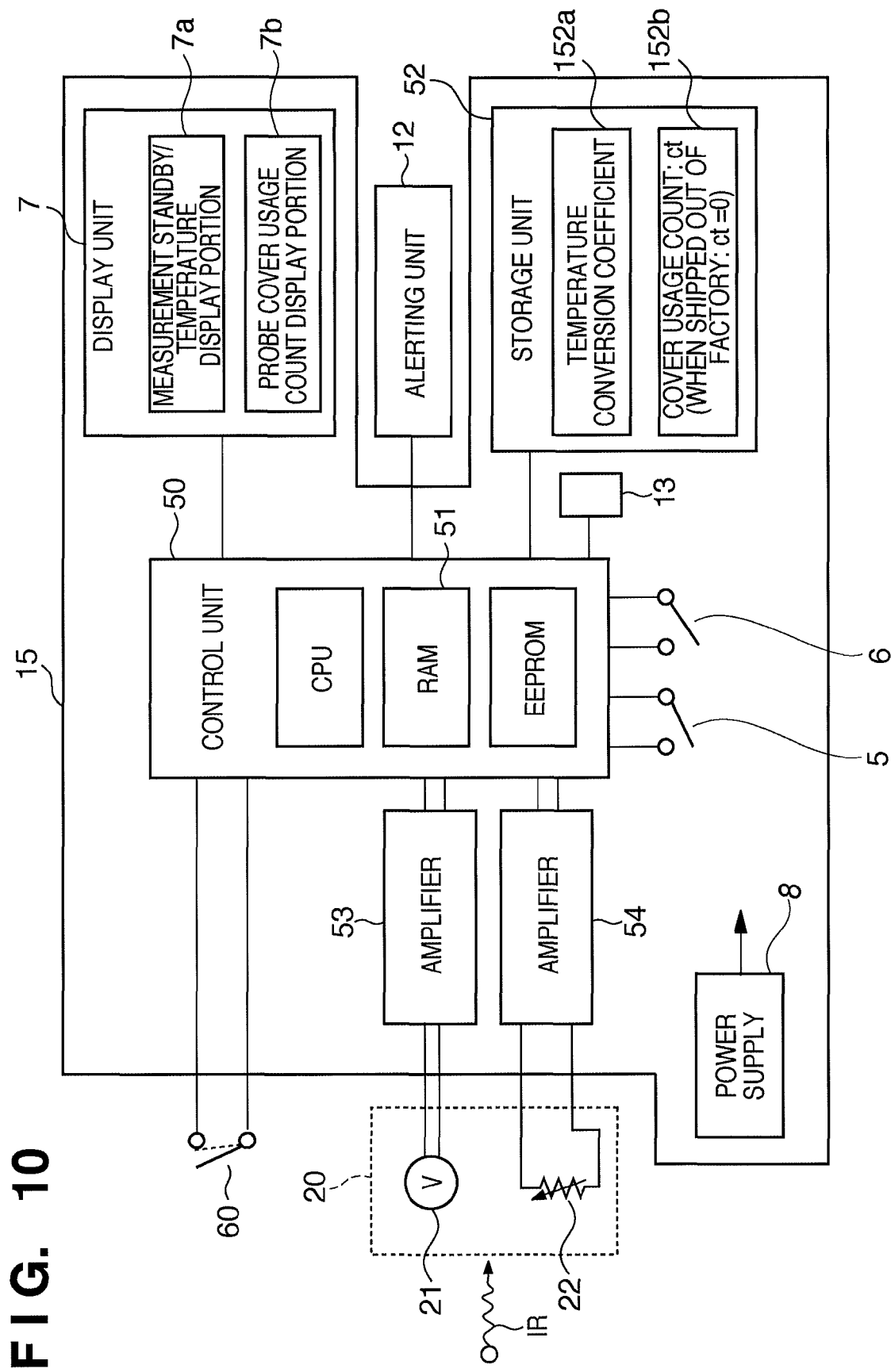
FIG. 10 is a block diagram of another embodiment of the ear-type thermometer 1.

FIG. 10 is a block diagram of the ear-type thermometer 1 according to a different embodiment. Parts that are already explained will be assigned the same numbers as before and their explanations will be omitted. According to this figure, the thermistor 21 installed in the detection element housing 20 shown in dashed lines is connected to the amplifier 53 mounted on the mounting board 15 via the wires 30. Further, the infrared detection element 22 which detects infrared light IR is connected to the amplifier 54 mounted on the mounting board 15 via the wires 30.

Also, the probe cover detection switch 60 is connected to a port of the control unit 50 mounted on the mounting board 15. The control unit 50 mounted on the mounting board 15 comprises the CPU element, the RAM 51 (Random Access Memory) which is a storage element and the storage unit 52 comprised of a ROM (read only memory). This storage unit 52 comprises a storage unit 152a for storing temperature conversion coefficients, and a storage unit 152b which stores probe cover usage count, ct. Further, the control unit 50 is connected to the LED elements 13, the display unit 7 having standby-display and temperature-display portions, the speaker 12 which functions as an alerting unit, the power switch 5, and the measurement switch 6. Further, the control unit 50 is configured to receive supply of electric power from the power supply 8, which is a button battery, and operate. Additionally, the liquid crystal display unit 7 has the measurement standby/temperature display portion 7a and the probe cover usage count display portion 7b.

Next, an exemplary operation will be explained using each of accompanying flow charts.

<<Battery Insertion Program>>

Figure 11:
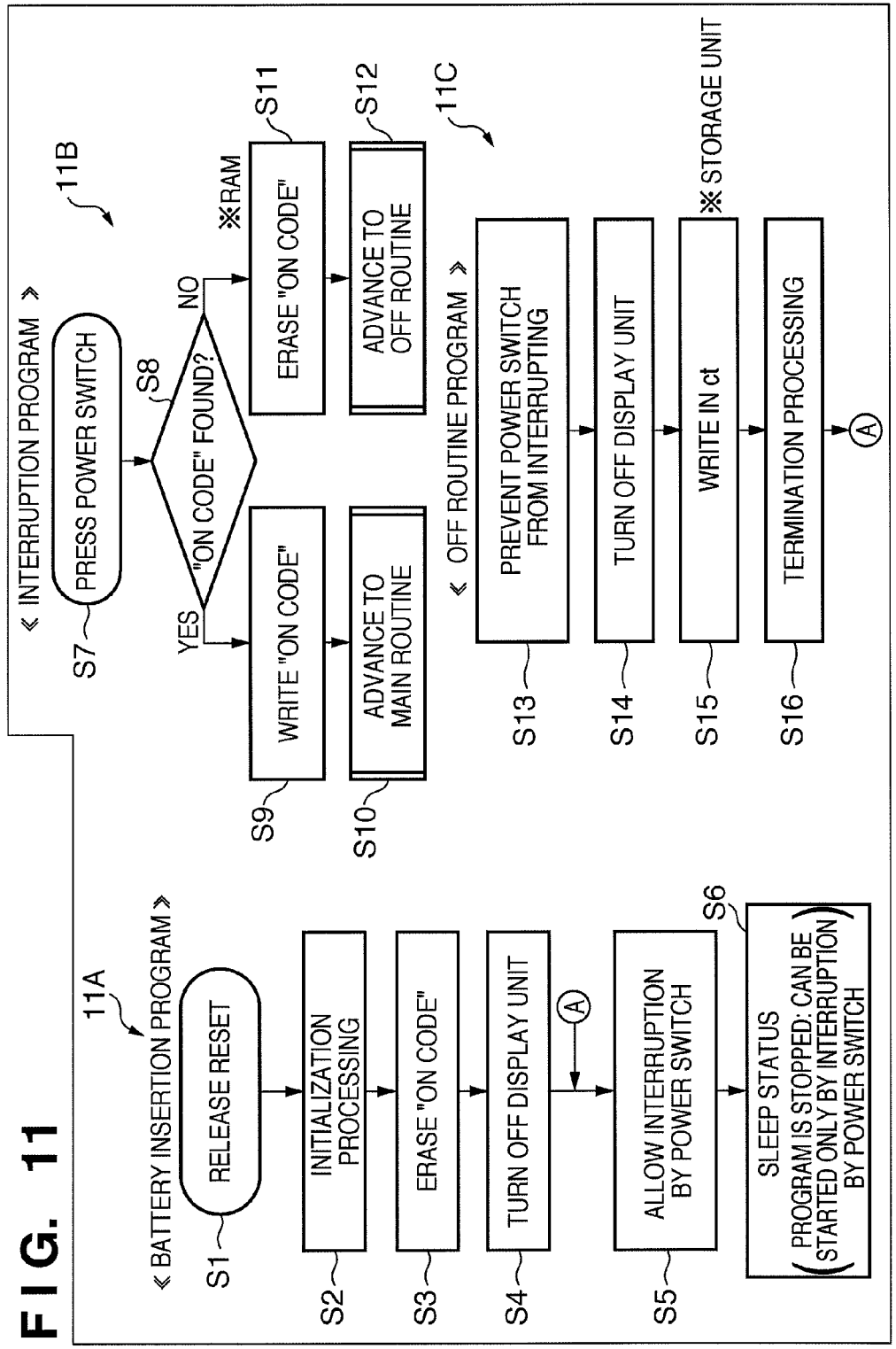
FIG. 11 shows a flowchart explaining operation of a battery insertion program (11A), a flowchart explaining operation of an interrupt processing program (11B), and a flowchart explaining operation of an off-routine program.

In FIG. 11, 11A is a flow chart explaining operation of a battery insertion program. In this figure, when the battery insertion program is started and a new button battery 8 is inserted after an old button battery 8 has run out, reset is released at step S1 and the process advances to step S2 in which initialization processing such as initial configuration of ports and clearance of the RAM (random access memory) are carried out. Subsequently, at step S3, erase of "ON code" of the RAM is performed, and the display portion of the liquid crystal display unit 7 is turned off at step S4. This "ON code" is a code used to discriminate whether power supply operation is a power ON operation or a power OFF operation by referring to it after the power supply operation. When an "ON code" is written, the operation is determined to be an OFF operation. When the "ON code" is not written, the operation is determined to be an OFF operation.

Next, the process advances to step S5 and allows interrupt by the power switch 5, and transitions to the sleep status in step S6. In other words, the program is stopped, and is put in a status in which the program can only be started by interrupt by operating the power supply switch. The power switch interrupt will be automatically prohibited when release from reset state. The sleep status is a status in which the battery insertion program is stopped, and can only be deactivated by power supply switch interrupt. When the power switch 5 is pressed, power switch interrupt is generated and an interrupt processing program is performed.

<<Interrupt Processing Program>>

In FIG. 11, 11B shows a flow chart which explains operation of the interrupt processing program. In this figure, when the power supply switch 5 is pressed at step S7, the interrupt processing program starts. The process advances to step S8 and it is checked whether an "ON code" is written into the RAM. When it is checked there is no "ON code" written into the RAM at step S8, the process advances to step S9 and an "ON code" is written, and then the process advances to step S10 and jumps to a main routine program that will be discussed later. On the other hand, when it is checked at step S8 that an "ON code" is written, the process advances to step S11 and erases the "ON code", and then further advances to step S12 at which point the process jumps to the main routine program.

In the flow chart explaining the operation of an off routine program shown in FIG. 11(11C), power supply switch interrupt is prohibited once at step S13, and the process advances to step S14 in which the display portion of the liquid crystal display unit is turned off. Subsequently, at step S15, the usage count ct of the probe cover 10 is written into the storage unit. Then, at step S16, termination processing, such as processing of ports and turning off an analog power supply, is performed, after which the process cuts into step S4 of FIG. 11(11A), thereby allowing power supply switch interrupt and stands by in the sleep status.

<<Main Routine Program>>

Figure 12:
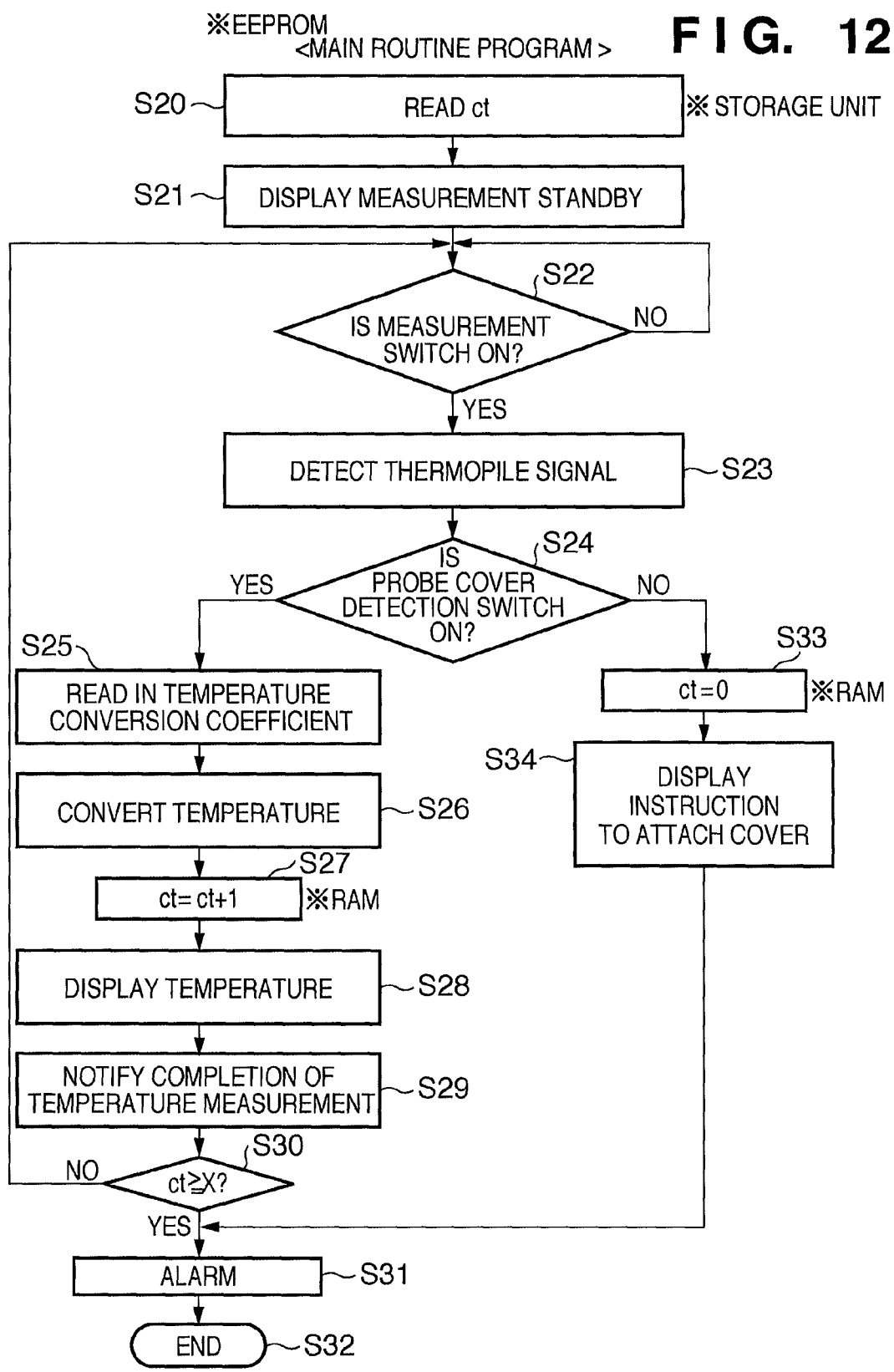
FIG. 12 is a flowchart explaining operation of a main routine program (11C).

FIG. 12 is a flow chart explaining operation of the main routine program. In this figure, when the power is turned on, the main routine starts. At step S20 the cover usage count ct is read from the storage unit, and the process advances to step S21 in which display indicating that the thermometer is in a measurement standby status using, for example, an icon, is performed on the liquid crystal device. Subsequently, at step S22, pressing of the measurement switch 6 is waited for. When it is determined at step S22 that the measurement switch 6 is pressed, the process advances to step S23 and detects electric temperature signals from each of the detection elements 21 and 22 which are thermopiles. Subsequently, at step S24 it is checked whether the probe cover detection switch 60 is in an ON status, and determines that the probe cover 10 is properly attached when the detection switch is in the ON status. Then the process advances to step S25, and a temperature conversion coefficient is read out from the storage unit.

The process advances to step S26 and a body temperature which is measured by temperature conversion based on the read-in temperature conversion coefficient is obtained. Subsequently, at step S27, 1 is added to the probe cover usage count ct stored in the RAM and is stored back in the RAM. At step S29, the body temperature obtained from step S26 is displayed, and at step S29 an alert notifying completion of temperature detection is performed with the speaker 12, and pressing of the measurement switch is awaited for the subsequent round of measurement.

The process continues on to step S30, and determination of whether the usage count ct has exceeded the usage count limit X, for example, 50 times, is performed, and if the usage count does not exceed the limit the process returns to step S22. Further, if it is determined at step S30 that the usage count has exceeded the usage count limit X, the process advances to step S31 and prompts exchange of the probe cover by generating an alarm sound from the speaker 12, which is an alerting means, and completes processing. Alternatively, the process can be forced to stop, and a message instructing replacement can be displayed on the liquid crystal display unit and usage thereafter can be prohibited (step S32)

On the other hand, at step S24 if it is determined that the probe cover detection switch 60 is turned off, it is determined that the probe cover 10 is removed and clears the probe cover usage count ct stored in the RAM to zero. Then the process advances to step S34 and displays an instruction to attach the probe cover 10, and then awaits pressing of the measurement switch.

With each of the programs discussed above, it is possible to correctly update the cover usage count ct even when the button battery is removed. Further, while the power is turned on, the updating of the probe cover usage count at is only performed in the RAM regardless of how many times measurement is made, preventing excessive writing in the storage unit. In other words, the determination unit, by comprising a storage unit which preferentially stores usage count regardless of whether power supply is loaded or not, is capable of correctly updating the cover usage count ct.

The present invention is not limited to the above-described embodiments, and can be modified in various ways within the spirit and scope of the invention. Accordingly, appended claims are provided to make the scope of the present invention known.

The invention claimed is:

1. An ear-type thermometer having a probe formed with a probe opening at its tip which houses a temperature detection element which detects ambient temperature and an infrared detection element which detects infrared light emitted from a temperature measurement site within the aural cavity, and measures body temperature based on detection results from said two detection elements, the ear-type thermometer comprising:

a probe cover which can be detachably provided onto said probe and covers said probe opening;

a detection means which detects attachment/detachment of said probe cover onto said probe; and a correction means which corrects, based on the detection result of said detection means, body temperature which is measured based on detection results of said two detection elements wherein:

said correction means performs temperature correction which calculates correlation coefficient between detected temperature signal based on the detection results of said two detection elements and actual body temperature signal based on actual body temperature, and said correction means also performs temperature conversion using a first temperature conversion coefficient calculated by applying said temperature correction in a state without said probe cover and a second temperature conversion coefficient calculated by applying said temperature correction in a state with said probe cover.

2. An ear-type thermometer according to claim 1, comprising:

a probe cover attachment tool which fixes said probe cover in a state attached to said probe, said probe having an end face formed to have said probe opening, an inner side surface of a hollow cylindrical body, and a locking part which protrudes inward from said inner side surface, a detection element housing body which includes a mounting base member onto which said two detection elements are fixed, a cylindrical container member fixed to said mounting base member which surrounds said two detection elements and has a hole which orients said two detection elements towards said opening, and a window member attached on top of and blocks said hole, and transmits infrared radiation through, wherein said window member of said detection element housing body contacts said end face on the side of said detection elements so as to cover said probe opening, and said mounting base member is fixed by said engagement part, and wherein said detection means includes a mechanical contact switch which is placed on said inner side surface and makes contact against the inner perimeter surface of said probe cover, an electric contact switch which is placed on said inner side surface and makes contact against a conductive layer which is laid on the inner perimeter surface of said probe cover, or an optical switch which is placed on said inner side surface and detects reflected light from a reflective layer which is laid on the inner perimeter surface of said probe cover.

3. An ear-type thermometer according to claim 1, comprising:

a probe cover attachment tool which fixes said probe in an attached state by locking in a flange portion of said probe cover;

a detection element housing body placed on a mounting board which includes a mounting base member onto which said two detection elements are fixed, and a cylindrical container member fixed to said mounting base member which surrounds said two detection elements and has a hole which orients said infrared detection element; and a light guiding tube placed between said probe opening and said hole, wherein said detection means is placed on said mounting board and include an optical switch which detects a reflective layer laid on said flange portion using reflection of light.

4. An ear-type thermometer according to claim 1, further comprising a main body cover which covers a liquid crystal display unit that performs display of body temperature measurement results, wherein said probe is formed as a single unit with said main body cover such that said probe is on the same side as said liquid crystal display unit.

5. An ear-type thermometer having a probe formed with a probe opening at its tip which houses a temperature detection element which detects ambient temperature and an infrared detection element which detects infrared light emitted from a temperature measurement site within the aural cavity, and measures body temperature based on detection results from said two detection elements, comprising:

a probe cover which can be freely attached and detached onto and from said probe and covers said probe opening;

a detection means which detects attachment/detachment of said probe cover onto said probe;

a correction means which corrects, based on the detection result of said detection means, body temperature based on detection results of said two detection elements;

a determination means which determines whether or not said probe cover has been used more than a usage count limitation based on the actual usage count; and an alert means or a display means for alerting need to replace said probe cover when the determination result from said determination means exceeds said usage count limitation wherein:

said correction means performs temperature correction which calculates correlation coefficient between detected temperature signal based on the detection results of said two detection elements and actual body temperature signal based on actual body temperature, and said correction means also performs temperature conversion using a first temperature conversion coefficient calculated by applying said temperature correction in a state without said probe cover and a second temperature conversion coefficient calculated by applying said temperature correction in a state with said probe cover.

6. An ear-type thermometer according to claim 5, comprising:

a probe cover attachment tool which fixes said probe cover to said probe in a state attached to said probe, said probe having an end face formed to have said probe opening, an inner side surface of a hollow cylindrical body, and a locking part which protrudes inwards from said inner side surface, a detection element housing body which includes a mounting base member onto which said two detection elements are fixed, a cylindrical container member fixed to said mounting base member, surrounds said two detection elements, and has a hole which orients said two detection elements towards said opening, a cylindrical window member attached on top of and blocks said hole, and passes infrared light through, wherein said window member of said detection element housing body contacts said end face on the side of said detection elements such that said probe opening is blocked while said mounting base member is fixed in place by said engagement part, wherein said detection means includes a mechanical contact switch which is placed on said inner side surface and makes contact against the inner perimeter surface of said probe cover, an electric contact switch which is placed on said inner side surface and makes contact against a conductive layer which is laid on the inner perimeter surface of said probe cover, or an optical switch is placed on said inner side surface and detects reflected light from a reflective layer which is laid on the inner perimeter surface of said probe cover.

7. An ear-type thermometer according to claim 5, comprising:
   a probe cover attachment tool which fixes said probe in an attached state by locking in a flange portion of said probe cover;
   a detection element housing mounted onto a mounting board, and including a mounting base member for fixing said two detection elements, a cylindrical container member having a hole facing said infrared detection element while being fixed to said mounting base member and surrounding said two detection elements; and
   a light guiding tube placed between said probe opening and said hole, wherein said detection means is placed on top of said mounting board and includes an optical switch which detects a reflective layer laid on said flange portion using reflection of light.

8. An ear-type thermometer according to claim 5, further comprising:
   a main body cover which covers a liquid crystal display unit that performs display of body temperature measurement results, wherein said probe is formed as a single unit with said main body cover such that said probe is on the same side as said liquid crystal display unit.

9. An ear-type thermometer according to claim 5, wherein said determination means comprises a storage means which preferentially stores said usage count regardless of whether a power supply means is loaded or not.

* * * * *